United States Patent [19]

Dufour

[11] Patent Number: 5,613,205
[45] Date of Patent: Mar. 18, 1997

[54] SYSTEM AND METHOD OF LOCATING A MOBILE TERMINAL WITHIN THE SERVICE AREA OF A CELLULAR TELECOMMUNICATION SYSTEM

[75] Inventor: Daniel Dufour, Blainville, Canada

[73] Assignee: Telefonaktiebolaget LM Ericsson, Stockholm, Sweden

[21] Appl. No.: 414,362

[22] Filed: Mar. 31, 1995

[51] Int. Cl.$^6$ ................................ H04Q 7/00; H04Q 9/00
[52] U.S. Cl. ...................... 455/33.2; 455/33.1; 455/33.4; 455/54.1; 455/56.1
[58] Field of Search ................................. 455/33.1, 33.2, 455/33.4, 54.1, 56.1, 62; 342/126, 450, 454, 457, 59

[56] References Cited

U.S. PATENT DOCUMENTS

| | | | |
|---|---|---|---|
| 5,175,867 | 12/1992 | Wejke et al. | 455/33.1 |
| 5,208,756 | 5/1993 | Song | 364/449 |
| 5,293,642 | 3/1994 | Lo | 455/33.1 |
| 5,293,645 | 3/1994 | Sood | 455/54.1 |
| 5,327,575 | 7/1994 | Menich et al. | 455/33.1 |
| 5,345,448 | 9/1994 | Keskitalo | 455/33.2 |
| 5,369,681 | 11/1994 | Boudreau et al. | 455/33.1 |

*Primary Examiner*—Reinhard J. Eisenzopf
*Assistant Examiner*—Gertrude Arthur
*Attorney, Agent, or Firm*—Smith & Catlett, P.C.

[57] ABSTRACT

A mobile terminal locator for locating a mobile terminal in a cellular telecommunication system having a plurality of base stations and associated cells. The mobile terminal locator identifies a plurality of candidate handoff cells having sufficient signal strength to maintain a call with the mobile terminal, and forces sequential handoffs of the mobile terminal from its serving cell to the plurality of candidate handoff cells. The locator then measures signal strength and propagation delay between the mobile terminal and each base station associated with each of the plurality of candidate handoff cells and between the mobile terminal and the serving base station. Either the signal strength, the propagation delay, or both are then used to calculate a distance between the mobile terminal and each base station associated with each of the plurality of candidate handoff cells and between the mobile terminal and its serving base station. From the calculated distances, a plurality of arcs of possible locations of said mobile terminal are then defined, the arcs being centered on the serving base station and each base station associated with each of the plurality of candidate handoff cells. Finally, the mobile terminal locator calculates an intersection point of the plurality of arcs of possible locations, the intersection point defining the location of the mobile station. The locator may operate in cellular telecommunication systems with or without synchronized timing reference signals from the base stations.

17 Claims, 5 Drawing Sheets

FIG. I

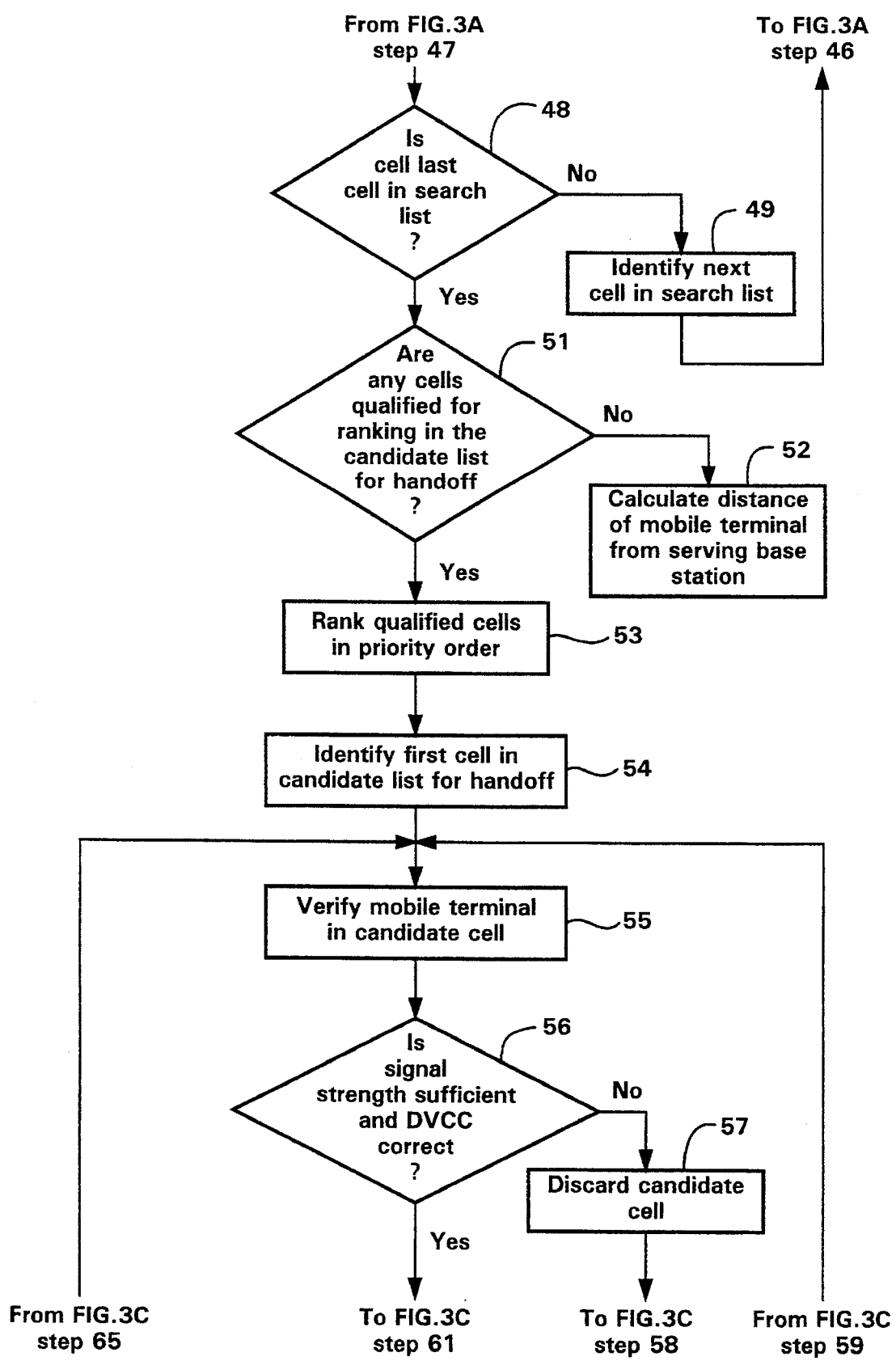

SYSTEM AND METHOD OF LOCATING A MOBILE TERMINAL WITHIN THE SERVICE AREA OF A CELLULAR TELECOMMUNICATION SYSTEM

BACKGROUND OF THE INVENTION

1. Technical Field of the Invention

This invention relates to cellular telecommunication systems and, more particularly, to a system and method of locating a mobile terminal operating within the service area of a cellular telecommunication system.

2. Description of Related Art

In modern cellular telecommunication systems, the service area is divided into cells, each of which is served by one base station. As mobile terminals move about the service area of the system, they are handed off from one cell to another so that there is no lapse in service. In times of emergency, such location information would be extremely useful to police or emergency crews responding to the situation.

A major problem with existing solutions for locating mobile terminals is the high cost and complexity required for their implementation into the existing cellular network infrastructure. Some solutions require extensive modifications to base stations or other components of the cellular telecommunication system. Others require extensive modifications to mobile terminals and are inadequate due to the large number of unmodified mobile terminals already in service.

Although there are no known prior art teachings of a solution to the aforementioned deficiencies and shortcomings such as the solution disclosed herein, a number of prior art references exist that discuss subject matter that bears some relation to matters discussed herein. Such prior art references are U.S. Pat. Nos. 5,293,645 to Sood; 5,293,642 to Lo; and 5,208,756 to Song. Each of these references is discussed briefly below.

U.S. Pat. No. 5,293,645 to Sood (Sood) discloses a system and method of locating a movable radio terminal within a cellular telephone network. Sood requires that a plurality of base stations transmit synchronized timing reference signals. A receiver in the network receives a transmission from the radio terminal to be located that includes information compiled at the radio terminal indicating relative propagation delays in receipt of the timing reference signals from at least three base stations. A processor coupled with the receiver processes the transmission to convert the propagation delays into a geographic location of the radio terminal.

There are several disadvantages of the locating method disclosed in Sood. First, existing networks must be modified to enable all of the base stations to simultaneously transmit synchronized timing reference signals. Second, mobile radio terminals must be modified to compile information indicating relative propagation delays in the receipt of the timing reference signals from at least three base stations. Third, mobile terminals must be modified to transmit this compiled information. Fourth, a receiver must be modified or added to the network to receive the transmissions from mobile terminals indicating relative propagation delays. Fifth, a processor must be added to the network to convert the propagation delays into a geographic location of the radio terminal. Overall, Sood provides a very expensive and logistically complex method of locating mobile terminals.

U.S. Pat. No. 5,293,642 to Lo (Lo) discloses a method of estimating the location of a mobile station in a cellular communication system. The mobile station measures radio propagation parameters between the mobile station and each base station within propagation range of the mobile station. The measured parameters may include signal strength and radio propagation delay, and are used with base station antenna radiation pattern data to derive information concerning radio path attenuation. These parameters are then used to define a location probability density function for each individual base station. A joint probability density function is then constructed by combining the individual functions from each base station. The joint probability density function is then used to statistically estimate the probable location of the mobile station.

Like Sood, the solution disclosed in Lo suffers from several disadvantages. First, the cellular communication system and mobile stations must be modified to detect and compute the various radio propagation parameters for each base station. Lo does not disclose how parameters such as radio path attenuation are to be determined, but states only that they may be determined by means of radio signal strength measurement techniques using a vehicle mounted test transmitter, or by theoretical models of propagation, or by a combination of the two. It would be a very expensive and time-consuming operation to determine such radio propagation parameters for the coverage area of every base station in the communication system. Second, this large amount of data must be stored and readily recalled for use in rapidly calculating probability density functions. Third, additional processors must be added to the communication system for performing these functions. Thus, Lo also provides a very expensive and logistically complex method of locating mobile terminals.

U.S. Pat. No. 5,208,756 to Song (Song) discloses a vehicle locating and navigating system using a cellular telephone network. In Song, a mobile telephone device measures relative signal strengths of control signals received from several base stations. The device then calculates the distance between the vehicle and each base station as a function of the transmitted power, received power, and signal attenuation factors of the signals transmitted by each base station. The device then uses trilateralization or arculation to determine the location of the vehicle as a function of the calculated distances and the known locations of the base stations.

Song suffers from the disadvantage that major modifications must be made to existing mobile telephones to implement the Song method. First, a memory device must be added to store information on each base station such as geographic location and transmitter power. Song does not disclose how data such as signal attenuation factors for each base station and location in the coverage area are to be determined, nor does Song disclose how such a large amount of data is to be stored in the mobile telephone device. Second, this information must be updated if additional base stations are added, transmitter power changes, or any other signal attenuation factors change. Third, a processor must be added to calculate distances from each base station and perform the trilateralization or arculation required to determine the geographic location of the mobile telephone. Thus, Song also provides a very expensive and logistically complex method of locating mobile terminals.

Review of each of the foregoing references reveals no disclosure or suggestion of a system or method such as that described and claimed herein.

It would be a distinct advantage to have a system and method of locating mobile terminals in a cellular telecommunication system that does not require base stations to transmit synchronized timing reference signals and does not require extensive modifications to the telecommunication system infrastructure or to the thousands of existing mobile terminals. The present invention provides such a system and method.

SUMMARY OF THE INVENTION

In one aspect, the present invention is a mobile terminal locator for locating a mobile terminal in a cellular telecommunication system having a plurality of base stations and associated cells, the mobile terminal being served by one of the plurality of base stations. The mobile terminal locator comprises means for identifying a plurality of candidate handoff cells having sufficient signal strength to maintain a call with the mobile terminal. There is also a means for forcing sequential handoffs of the mobile terminal from its serving cell to the plurality of candidate handoff cells having sufficient signal strength to maintain a call. Additionally, there is a means for measuring signal strength and propagation delay between the mobile terminal and each base station associated with each of the plurality of candidate handoff cells and between the mobile terminal and the serving base station. The mobile terminal locator also includes means for calculating a distance between the mobile terminal and each base station associated with each of the plurality of candidate handoff cells and between the mobile terminal and its serving base station. A defining means defines a plurality of arcs of possible locations of the mobile terminal, the arcs being centered on the serving base station and each base station associated with each of the plurality of candidate handoff cells. Finally, there is a means for calculating an intersection point of the plurality of arcs of possible locations, the intersection point defining the location of the mobile station. The mobile terminal locator may operate in cellular telecommunication systems with or without synchronized timing reference signals from the base stations.

In another aspect, the present invention is a method of locating a mobile terminal in a cellular telecommunication system having a plurality of base stations and associated cells, the mobile terminal being served by one of the plurality of base stations. The method begins by identifying a plurality of candidate handoff cells having sufficient signal strength to maintain a call with the mobile terminal, and forcing sequential handoffs of the mobile terminal from its serving cell to the plurality of candidate handoff cells having sufficient signal strength to maintain a call. Next, the method includes measuring signal strength and propagation delay between the mobile terminal and each base station associated with each of the plurality of candidate handoff cells and between the mobile terminal and the serving base station. Either the signal strength, the propagation delay, or both are then used to calculate a distance between the mobile terminal and each base station associated with each of the plurality of candidate handoff cells and between the mobile terminal and its serving base station. From the calculated distances, a plurality of arcs of possible locations of said mobile terminal are then defined, the arcs being centered on the serving base station and each base station associated with each of the plurality of candidate handoff cells. Finally, the method includes calculating an intersection point of the plurality of arcs of possible locations, the intersection point defining the location of the mobile station.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIGS. 3A–3C are a flow chart illustrating the functions performed by the system of the present invention when locating a mobile terminal.

DETAILED DESCRIPTION OF EMBODIMENTS

Figure 1:
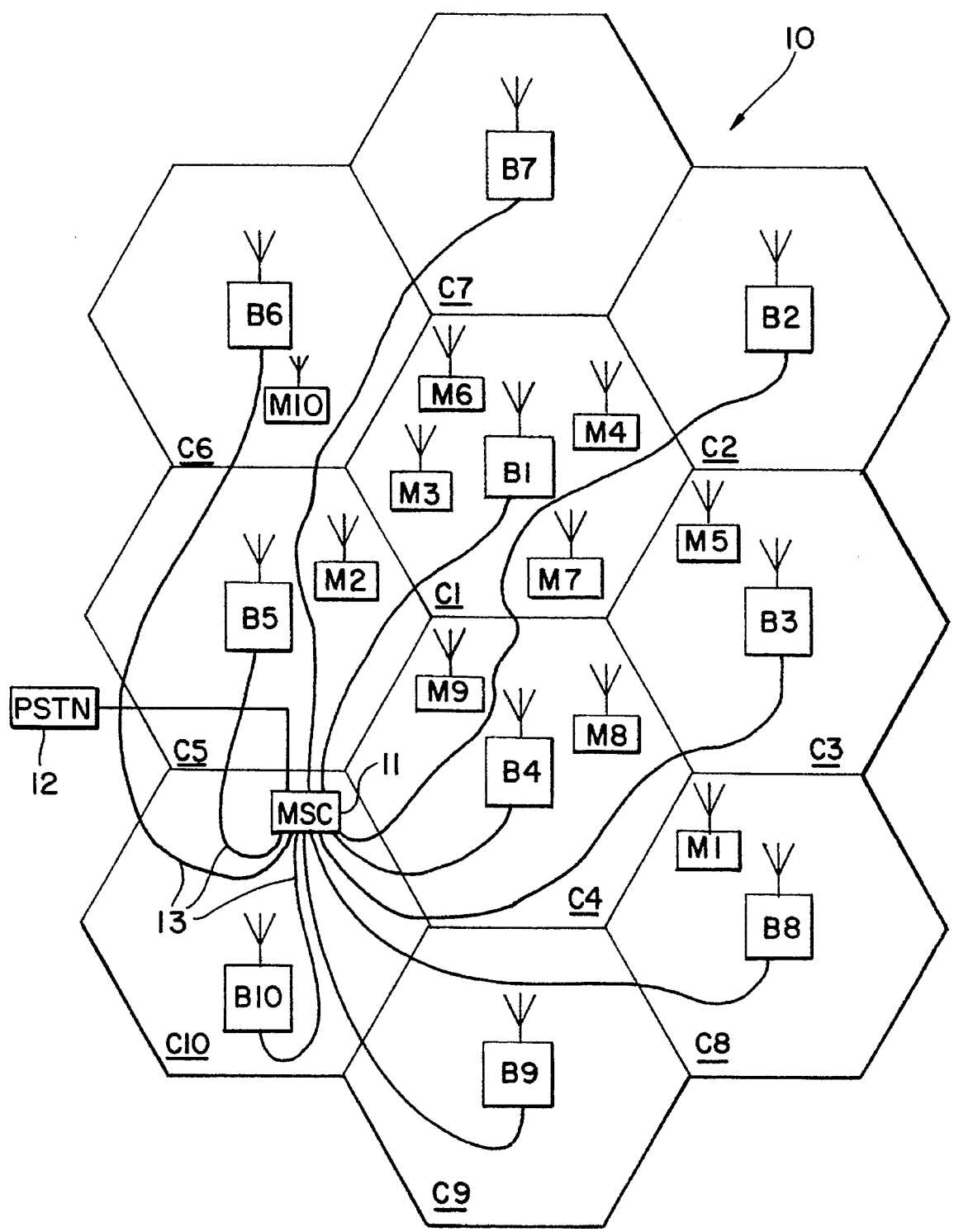
FIG. 1 (Prior art) is a block diagram illustrating components of a cellular radio communication system associated with the present invention.

Referring first to FIG. 1, there is illustrated a conventional cellular radio communication system 10 of the type to which the present invention may generally pertain. In FIG. 1, an arbitrary geographic area may be divided into a plurality of continuous radio coverage areas, or cells C1–C10. Although the system of FIG. 1 is illustratively shown to only include 10 cells, it should be clearly understood that in practice, the number of cells would be much larger.

Associated with and located within each of the cells C1–C10, is a base station designated as a corresponding one of a plurality of base stations B1–B10. Each of the base stations B1–B10 includes a transmitter, receiver, and a base station controller as are well known in the art. In FIG. 1, the base stations B1–B10 are selected to be located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of a mobile radio communications system within which a mobile terminal locator of the system of the present invention may be implemented.

Continuing reference to FIG. 1, a plurality of mobile terminals M1–M10 will be found within the cells C1–C10. Again, only ten mobile terminals are shown in FIG. 1, but it should be understood that the actual number of mobile terminals will be much larger and, in practice, will invariably greatly exceed the number of base stations. Moreover, mobile terminals M1–M10 are illustrated in some of the cells C1–C10. The presence or absence of mobile terminals in any particular one of the cells C1–C10 should be understood to depend, in practice on the individual desires of subscribers utilizing the mobile terminals M1–M10. Subscribers may roam from one location in a cell to another, or from one cell to an adjacent cell or neighboring cell, and even from one cellular radio system served by a mobile switching center (MSC) 11 to another such system all the while receiving and placing calls both within the cellular system 10 as well as the public switch telecommunication network (PSTN) 12 which is connected to the MSC 11.

Each of the mobile terminals M1–M10 is capable of initiating or receiving a telephone call through one or more of the base stations B1–B10 and the MSC 11. Such calls may be either for voice or data communications. The MSC 11 is connected by communication links 13 (e.g., cables) to each of the illustrative base stations B1–B10 and the PSTN 12 or a similar fixed network which may be include an integrated services digital network (ISDN) facility (not shown). The relevant connections between the MSC 11 and the base stations B1–B10, or between the MSC 11 and the PSTN 12, are not completely shown in FIG. 1 but are well known to those of ordinary skill in the art. Similarly, it is also known to include more than one mobile switching center (MSC) in the cellular radio system and to connect each additional MSC to a different group of base stations and to other MSCs via cables or radio links.

Each of the cells C1–C10 is allocated a plurality of voice or speech channels and at least one access or control channel, such as a forward control channel (FOCC). The control channel is used to control or supervise the operation of the mobile terminal by means of information transmitted and received from those units, referred to as messages. Control and administration messages within a cellular radio system are sent in accordance with industry established air interface standards, such as AMPS and EIA/TIA 553, the standards for analog cellular operations, and/or D-AMPS, IS-54B, and the proposed IS-54C, the standards for digital cellular operations, all of which are hereby incorporated by reference herein. While these standards govern North American operations, similar standards govern other geographic areas throughout the world, and are well known to those skilled in the art.

The information exchanged between base stations and mobile terminals via messages, may include incoming call signals, outgoing call signals, paging signals, paging response signals, location registration signals, voice channel assignments, maintenance instructions and handoff instructions as the mobile terminals travel out of the radio coverage of one cell and into the radio coverage of other cells, as well as other additional items of information such as calling party numbers, time information, and the like. The control or voice channels may operate in either analog or digital mode or a combination thereof based upon industry standards. Integrated services between different cellular telecommunication systems are provided by using the intersystem specification IS-41, which is hereby incorporated by reference herein.

Figure 2:
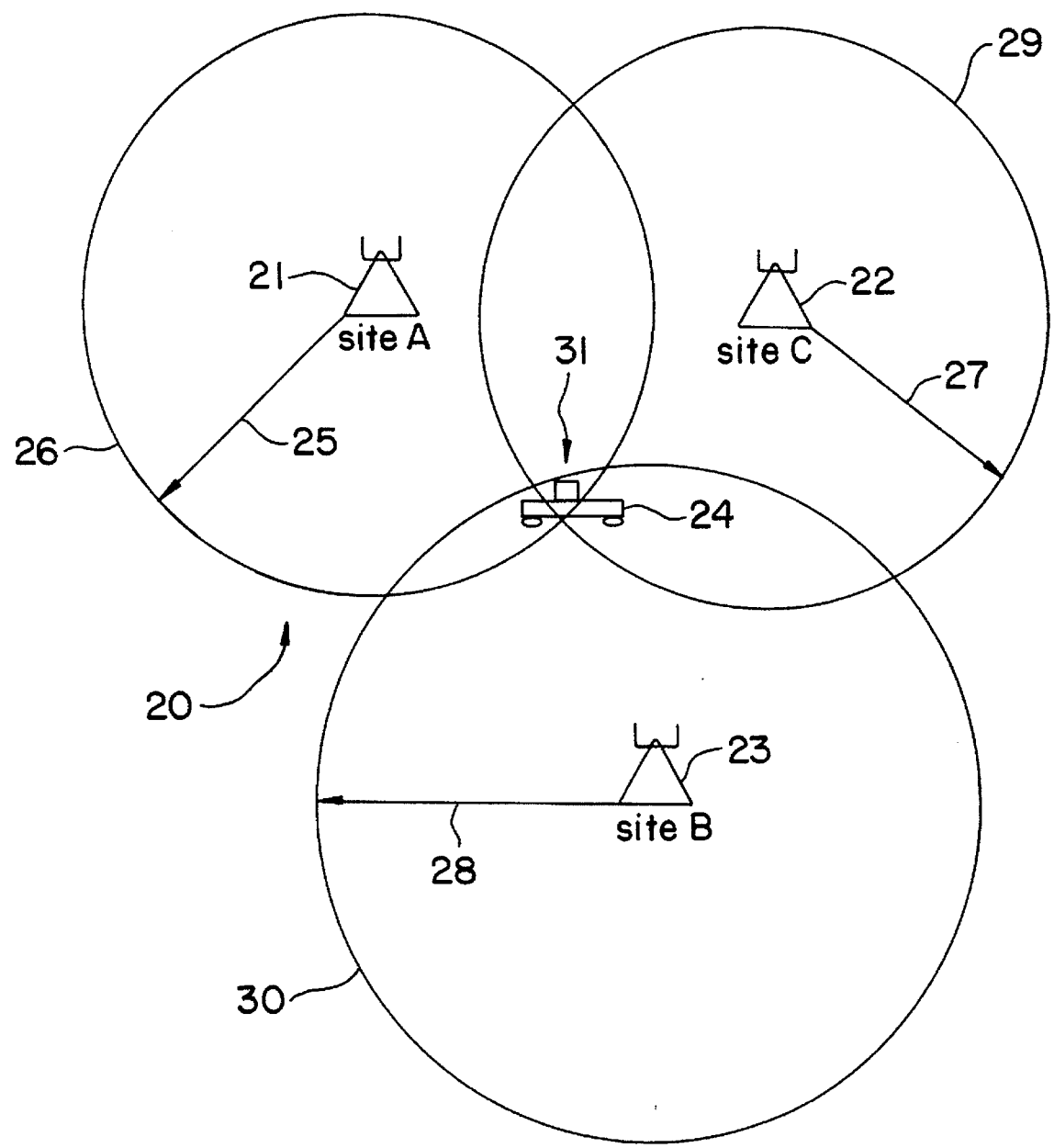
FIG. 2 is an illustrative diagram illustrating a search map constructed in accordance with the teachings of the preferred embodiment of the present invention.

FIG. 2 is an illustrative diagram illustrating a search map 20 constructed in accordance with the teachings of the preferred embodiment of the present invention. In the illustrative example of FIG. 2, three base stations 21–23 are utilized to determine the location of a Time Division Multiple Access (TDMA) mobile terminal 24 on the digital traffic channel. While only three base stations are utilized in the illustrative example of FIG. 2, it should be understood that a greater number may be utilized in practice. The present invention forces handoffs from a serving base station 21 to qualified handoff cells 22 and 23. By measuring signal strength, propagation delay, or both from the serving base station and the base station of each handoff cell, the distance of the mobile terminal 24 from each base station is calculated. Arcs of possible locations of the mobile terminal are then derived from the calculated distances. Well known geographical intersection techniques such as triangulation, arculation, probability density functions, and the like are then used to calculate the location of the mobile terminal 24.

Figure 3A:
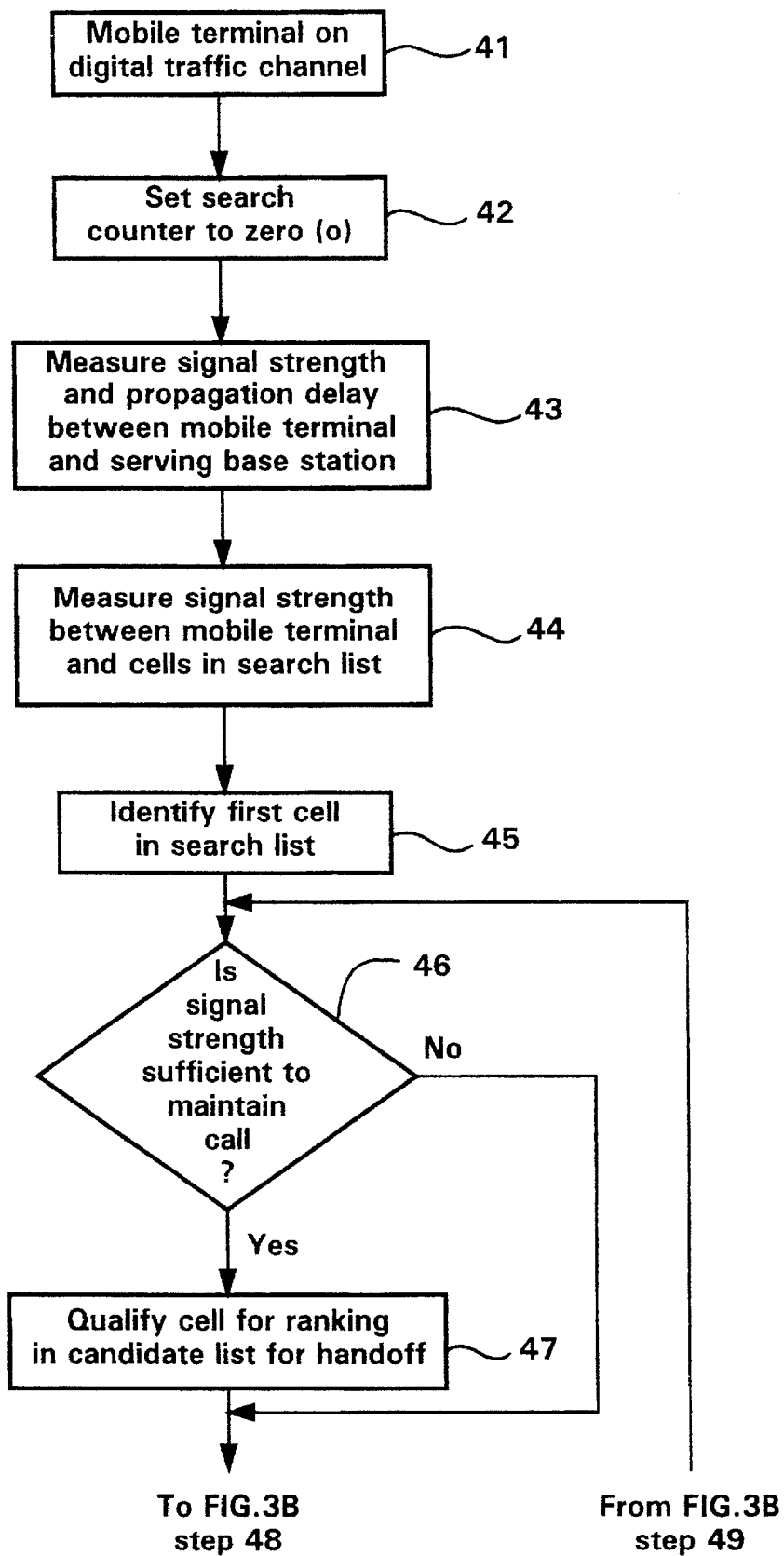
Figure 3C:
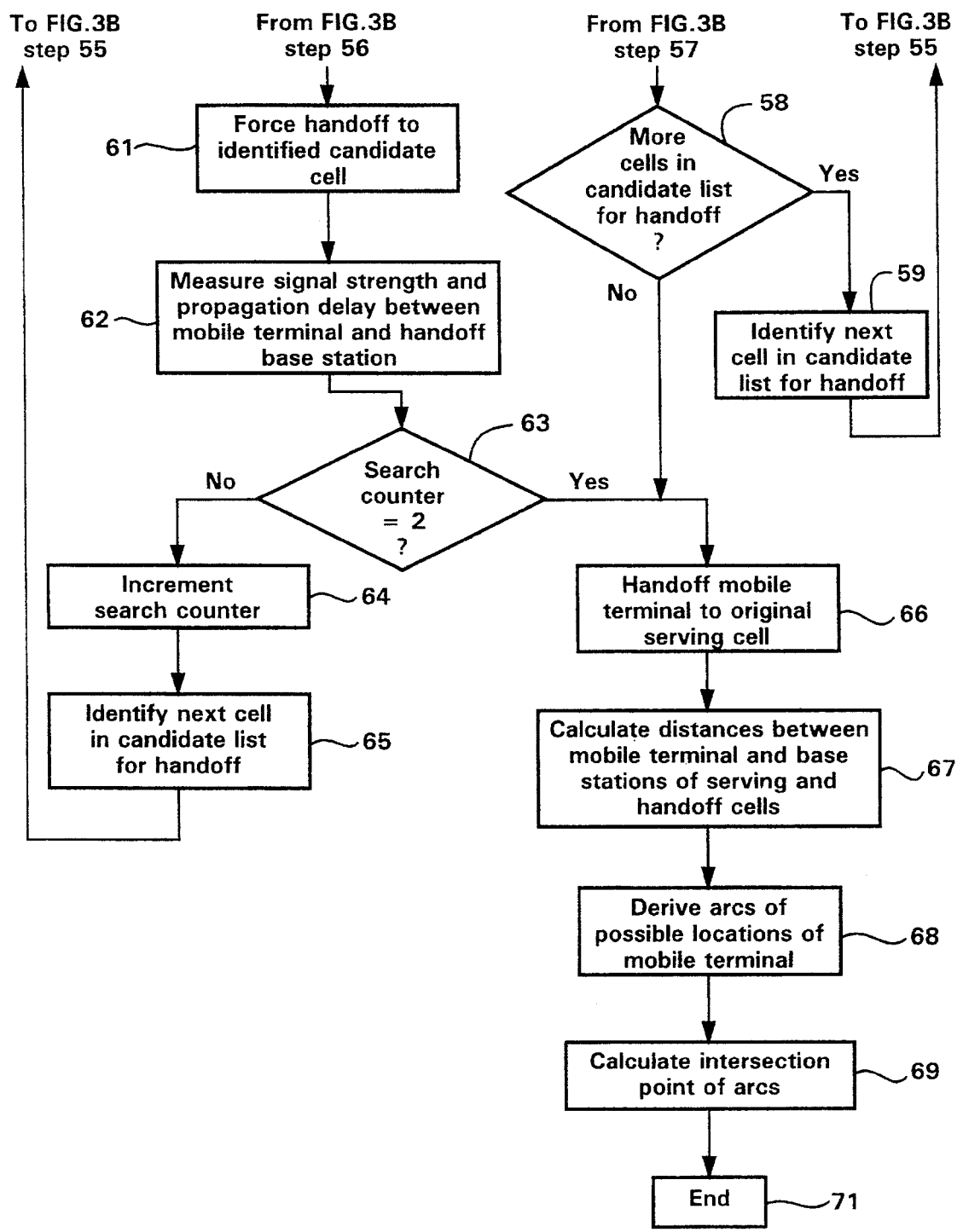

FIGS. 3A–3C are a flow chart illustrating the functions performed by the system of the present invention when locating a mobile terminal 24. Beginning with FIG. 3A, at step 41 the mobile terminal locator process begins. The process may be initiated either by the mobile subscriber requesting the locator service, or at the request of other parties such as police or emergency crews. Initiation of the process by police or emergency crews may be useful, for example, if a mobile subscriber has been involved in an automobile accident, and is unable to place a call for help because of injuries. If requested by other parties, the process may be performed as long as the mobile terminal is in an ON-state and is capable of responding to a page request and having a voice channel assigned. When a page response is received, a voice channel is assigned. An alert signal may then be sent to the mobile terminal 24, but does not have to be sent in order for the location process to proceed. There may be scenarios, for example, when the police would like to locate a mobile terminal without alerting the subscriber, and the present invention provides such a capability.

At step 42, a search counter is set to zero (0). At step 43, the system measures the signal strength and propagation delay between the mobile terminal and its serving base station, and stores this information in a data file for further processing. The signal strength is measured by the mobile terminal, and in accordance with industry standards, the propagation delay is measured by the base station. The process then moves to step 44 and measures the signal strength between the mobile terminal and each cell in a search list. Initially, the search list may be the neighbor list or mobile assisted handoff (MAHO) list for the mobile terminal in the serving cell. An extended neighbor list or a subset of the neighbor list may also be utilized. Signal strength may be measured at either the base station or the mobile terminal (i.e., on the up-link or down-link). In the preferred embodiment, the signal strength is measured at the mobile terminal.

The process then moves to step 45 and identifies the first cell in the search list. At step 46, it is determined whether or not the signal strength from the first cell is sufficient to maintain a call. If the signal strength is not sufficient, the process moves to step 48. If, however, the signal strength is sufficient, the process moves to step 47 where the cell is qualified for ranking in a candidate list for handoff.

The process then moves to FIG. 3B, step 48, where it is determined whether or not the cell being measured is the last cell in the search list. If it is determined that the cell is not the last cell in the search list, the process moves to step 49 where the next cell in the search list is identified. The process then returns to step 46 (FIG. 3A) and repeats steps 46–49 for each cell in the search list. When it is determined at step 48 that the cell being measured is the last cell in the search list, the process moves to step 51 where it is determined whether or not any cells qualified for ranking in the candidate list for handoff. If no cells qualified for ranking (i.e., no cells had sufficient signal strength to maintain a call), then the location of the mobile station can only be determined within the serving cell. Thus, the process moves to step 52 where the distance of the mobile terminal from the serving base station is calculated. The distance may be calculated based on signal strength alone, propagation delay alone, or a combination of both. The result of this calculation is an arc centered on the base station. If the base station utilizes an omni-directional antenna, the arc forms a circle of possible locations around the base station. If the base station utilizes a directional sector antenna, then the arc is limited to that angular sector.

If, however, at step 51 it was determined that there are cells that qualified for ranking in the candidate list for handoff, then the process moves to step 53 where the qualified cells are ranked in priority order to form a prioritized candidate list for handoff. The priority may be determined according to decreasing signal strength or any other suitable criteria such as bit error rate, voice quality, interference level, carrier-to-interference (C/I) ratio, etc. In areas utilizing a layered cell structure of microcells and macrocells, some neighbor cells may be preferred, and this preference may be utilized as a criteria for priority ranking. The process then moves to step 54 where the first cell in the candidate list for handoff is identified. The process then verifies that the mobile terminal is in the identified candidate cell at step 55 by measuring the signal strength at the base station of the candidate cell.

The process then moves to step 56 where it is determined whether or not the measured signal strength is sufficient to maintain a call and that the associated digital verification color code (DVCC) correctly identifies the mobile terminal. If the signal strength is not sufficient, or the DVCC is incorrect, then the process moves to step 57 where the candidate cell is discarded from the candidate list for handoff. The process then moves to FIG. 3C, step 58, where it is determined whether or not there are more candidate cells in the candidate list for handoff. If there are no more cells in the list, the process moves ahead to step 66. If there are additional cells in the list, however, the process moves to step 59 and identifies the next cell in the candidate list for handoff. The process then returns to step 55 (FIG. 3B), verifies the mobile terminal's presence in the next cell, and continues as shown in FIG. 3B.

If, at step 56, it was determined that the measured signal strength is sufficient to maintain a call and that the associated digital verification color code (DVCC) correctly identifies the mobile terminal, then the process moves to FIG. 3C, step 61, where the process forces a handoff of the mobile terminal to the identified candidate cell. The process then measures the signal strength and propagation delay between the mobile terminal and the base station of the handoff cell at step 62, and stores this information in a data file at the MSC 11 for further processing. The process then moves to step 63 and determines whether or not the search counter is equal to two (2). If the search counter is not equal to 2, the process moves to step 64 and increments the search counter. The process then identifies the next cell in the candidate list for handoff at step 65. Thereafter, the process returns to step 55 (FIG. 3B) and continues the process for each candidate cell until it is determined at step 63 that the search counter is equal to two (2).

When the search counter is equal to two (2), the process moves to step 66 where the mobile terminal is handed off to the originally serving cell. The process then moves to step 67 where distances are calculated between the mobile terminal and the originally serving base station as well as each of the candidate cells which had sufficient signal strength and the correct DVCC. A processor at the MSC 11 calculates the mobile terminal's distance from each base station based on the signal strength and propagation delay information stored in the MSC data file. The distance calculations may be made on the basis of signal strength alone, propagation delay alone, or a combination of both. At 68, a processor at the MSC 11 utilizes the distance calculations to derive a set of arcs centered on the serving base station and the base stations of each of the measured candidate cells. The arcs represent possible locations of the mobile terminal. At step 69, the processor in the MSC 11 then calculates the intersection point of the set of arcs using well known geographical intersection techniques such as triangulation, arculation, probability density functions, and the like. The intersection point is the location of the mobile terminal. The process then ends at step 71.

Optionally, the present invention may include a graphic cellular display on which the latitude and longitude positions of the base stations 21–23 utilized in the search may be shown. The arcs of location 26, 29, and 30 may also be displayed as well as the intersection point 31 representing the location of the mobile terminal 24.

If the mobile terminal 24 is located near a boundary of the service area of the mobile switching center (MSC) 11 (FIG. 1), the candidate list for handoff cells may include cells in a neighboring MSC. In this case, standard inter-exchange handoff techniques are utilized. The handoffs to cells in other exchanges are identified as mobile terminal locator handoffs. This informs the neighboring MSC that the mobile terminal is to be handed back to the originating MSC 11 following the measurement of signal strength and propagation delay. The neighboring MSC also sends the measured signal strength and propagation delay to the originating MSC 11 for use in its location calculations.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of locating a mobile terminal in an unsynchronized cellular telecommunication system having a plurality of unsynchronized base stations and associated cells, said mobile terminal being served by one of said plurality of base stations, said method comprising the steps of:

identifying a plurality of candidate handoff cells having sufficient signal strength to maintain a call with said mobile terminal;

forcing sequential handoffs of said mobile terminal from said serving cell to said plurality of candidate handoff cells having sufficient signal strength to maintain a call;

measuring signal strength and propagation delay between the mobile terminal and each unsynchronized base station associated with each of said plurality of candidate handoff cells and between the mobile terminal and said serving base station;

calculating a distance between the mobile terminal and each unsynchronized base station associated with each of said plurality of candidate handoff cells and between the mobile terminal and said serving base station;

defining a plurality of arcs of possible locations of said mobile terminal, said arcs being centered on said serving base station and each unsynchronized base station associated with each of said plurality of candidate handoff cells; and calculating an intersection point of said plurality of arcs of possible locations, said intersection point defining the location of said mobile station.

2. The method of locating a mobile terminal in an unsynchronized cellular telecommunication system of claim 1 wherein the step of identifying a plurality of candidate handoff cells having sufficient signal strength to maintain a call with said mobile terminal includes identifying an initial search list comprising the serving cell's neighbor list.

3. The method of locating a mobile terminal in an unsynchronized cellular telecommunication system of claim 2 wherein the step of identifying a plurality of candidate handoff cells having sufficient signal strength to maintain a call with said mobile terminal includes the steps of:

measuring the signal strength between the mobile terminal and each unsynchronized base station associated with each of said cells in the serving cell's neighbor list; and making a list of the measured cells having sufficient signal strength to maintain a call with said mobile terminal.

4. The method of locating a mobile terminal in an unsynchronized cellular telecommunication system of claim 3 further comprising the step of prioritizing said cells in said list of candidate cells for handoff.

5. The method of locating a mobile terminal in an unsynchronized cellular telecommunication system of claim 1 wherein said step of calculating a distance between the mobile terminal and each unsynchronized base station associated with each of said plurality of candidate handoff cells and between the mobile terminal and said serving base station includes calculating said distances utilizing said measured propagation delays.

6. The method of locating a mobile terminal in an unsynchronized cellular telecommunication system of claim 1 wherein said step of calculating a distance between the mobile terminal and each unsynchronized base station associated with each of said plurality of candidate handoff cells and between the mobile terminal and said serving base station includes calculating said distances utilizing said measured signal strength.

7. The method of locating a mobile terminal in an unsynchronized cellular telecommunication system of claim 1 wherein said step of calculating a distance between the mobile terminal and each unsynchronized base station associated with each of said plurality of candidate handoff cells and between the mobile terminal and said serving base station includes calculating said distances utilizing a combination of said measured propagation delay and said measured signal strength.

8. The method of locating a mobile terminal in an unsynchronized cellular telecommunication system of claim 1 wherein said step of calculating an intersection point of said plurality of arcs of possible locations includes utilizing a geographic intersection technique from the group consisting of arculation, triangulation, and defining a probability density function.

9. A mobile terminal locator for locating a mobile terminal in an unsynchronized cellular telecommunication system having a plurality of unsynchronized base stations and associated cells, said mobile terminal being served by one of said plurality of base stations, said mobile terminal locator comprising:

means for identifying a plurality of candidate handoff cells having sufficient signal strength to maintain a call with said mobile terminal;

means for forcing sequential handoffs of said mobile terminal from said serving cell to said plurality of candidate handoff cells having sufficient signal strength to maintain a call;

means for measuring signal strength and propagation delay between the mobile terminal and each unsynchronized base station associated with each of said plurality of candidate handoff cells and between the mobile terminal and said serving base station;

means for calculating a distance between the mobile terminal and each unsynchronized base station associated with each of said plurality of candidate handoff cells and between the mobile terminal and said serving base station;

means for defining a plurality of arcs of possible locations of said mobile terminal, said arcs being centered on said serving base station and each unsynchronized base station associated with each of said plurality of candidate handoff cells; and means for calculating an intersection point of said plurality of arcs of possible locations, said intersection point defining the location of said mobile station.

10. The mobile terminal locator of claim 9 wherein the means for identifying a plurality of candidate handoff cells having sufficient signal strength to maintain a call with said mobile terminal includes means for identifying an initial search list comprising the serving cell's neighbor list.

11. The mobile terminal locator of claim 10 wherein the means for identifying a plurality of candidate handoff cells having sufficient signal strength to maintain a call with said mobile terminal includes:

means for measuring the signal strength between the mobile terminal and each unsynchronized base station associated with each of said cells in the serving cell's neighbor list; and means for making a list of the measured cells having sufficient signal strength to maintain a call with said mobile terminal.

12. The mobile terminal locator of claim 11 further comprising means for prioritizing said cells in said list of candidate cells for handoff.

13. The mobile terminal locator of claim 9 wherein said means for calculating a distance between the mobile terminal and each unsynchronized base station associated with each of said plurality of candidate handoff cells and between the mobile terminal and said serving base station includes means for calculating said distances utilizing said measured propagation delays.

14. The mobile terminal locator of claim 9 wherein said means for calculating a distance between the mobile terminal and each unsynchronized base station associated with each of said plurality of candidate handoff cells and between the mobile terminal and said serving base station includes means for calculating said distances utilizing said measured signal strength.

15. The mobile terminal locator of claim 9 wherein said means for calculating a distance between the mobile terminal and each unsynchronized base station associated with each of said plurality of candidate handoff cells and between the mobile terminal and said serving base station includes means for calculating said distances utilizing a combination of said measured propagation delay and said measured signal strength.

16. The mobile terminal locator of claim 9 wherein said means for calculating an intersection point of said plurality of arcs of possible locations utilizes a geographic intersection technique from the group consisting of arculation, triangulation, and defining a probability density function.

17. The mobile terminal locator of claim 9 wherein said means for measuring signal strength and propagation delay between the mobile terminal and each unsynchronized base station associated with each of said plurality of candidate handoff cells and between the mobile terminal and said serving base station includes means for measuring said signal strength and said propagation delay without synchronizing said base stations to transmit synchronized timing reference signals.

* * * * *

UNITED STATES PATENT AND TRADEMARK OFFICE
CERTIFICATE OF CORRECTION

PATENT NO. : 5,613,205
DATED : March 18, 1997
INVENTOR(S) : Daniel Dufour

It is certified that error appears in the above-indentified patent and that said Letters Patent is hereby corrected as shown below:

Column 7, line 21, change "tenninal's" to --terminal's--;

Signed and Sealed this

Fifth Day of August, 1997

Attest:

Attesting Officer

BRUCE LEHMAN
Commissioner of Patents and Trademarks